United States Patent
Jones, Jr. et al.

(10) Patent No.: US 7,292,948 B2
(45) Date of Patent: Nov. 6, 2007

(54) MAGNETIC POSITION AND ORIENTATION MEASUREMENT SYSTEM WITH EDDY CURRENT DISTORTION COMPENSATION

(75) Inventors: Herbert R. Jones, Jr., Williston, VT (US); Robert F. Higgins, Richmond, VT (US); Henry E. Himberg, Williston, VT (US)

(73) Assignee: Alken Inc., Colchester, VT (US)

( * ) Notice: Subject to any disclaimer, the term of this patent is extended or adjusted under 35 U.S.C. 154(b) by 87 days.

(21) Appl. No.: 11/112,580

(22) Filed: Apr. 22, 2005

(65) Prior Publication Data

US 2005/0246122 A1 Nov. 3, 2005

Related U.S. Application Data

(60) Provisional application No. 60/567,385, filed on Apr. 30, 2004.

(51) Int. Cl.
*G01R 23/00* (2006.01)
(52) U.S. Cl. ........................................ 702/75
(58) Field of Classification Search .................. 702/75
See application file for complete search history.

(56) References Cited

U.S. PATENT DOCUMENTS

| | | | |
|---|---|---|---|
| 4,287,809 A | 9/1981 | Egli et al. | 89/41 |
| 4,314,251 A | 2/1982 | Raab | 343/112 |
| 4,394,831 A | 7/1983 | Egli et al. | 89/41 |
| 4,737,794 A | 4/1988 | Jones | 342/448 |
| 5,453,686 A | 9/1995 | Anderson | 324/207.17 |
| 5,640,170 A | 6/1997 | Anderson | 343/895 |
| 5,645,077 A | 7/1997 | Foxlin | 128/774 |
| 5,752,513 A | 5/1998 | Acker et al. | 128/653.1 |
| 5,831,260 A | 11/1998 | Hansen | 250/221 |
| 6,172,499 B1 | 1/2001 | Ashe | 324/207.12 |
| 6,255,933 B1* | 7/2001 | Iwao | 336/200 |
| 6,288,785 B1 | 9/2001 | Frantz et al. | 356/614 |
| 6,528,989 B1* | 3/2003 | Hansen | 324/207.12 |
| 2004/0207389 A1* | 10/2004 | Nieminen et al. | 324/207.12 |

* cited by examiner

*Primary Examiner*—John Barlow
*Assistant Examiner*—Cindy Khuu
(74) *Attorney, Agent, or Firm*—Gifford, Krass, Groh, Sprinkle, Anderson & Citkowski, PC

(57) ABSTRACT

Techniques for removing distortion in an AC magnetic tracker identify a characteristic frequency in the distortion environment which is then utilized to extract distortion components from the tracker receiver signals so that the corrected position and orientation can be calculated. A multiplicity of alternative techniques for determining this characteristic frequency are disclosed, several of which can be done during operation without interrupting system operation while others can be done off-line. The invention also allows the use of a tuned tracker transmitter since it does not need to operate at multiple frequencies. The invention differs from the prior art by treating an extended conductor characteristic as just another unknown. The position and orientation algorithm solves the 6 unknown coordinates of position and orientation plus the one more unknown—the extended conductor characteristic frequency. This enables the tracker to operate full time in one mode of operation without ever suspending normal operation and without additional hardware capabilities.

18 Claims, 4 Drawing Sheets

MAGNETIC POSITION AND ORIENTATION MEASUREMENT SYSTEM WITH EDDY CURRENT DISTORTION COMPENSATION

REFERENCE TO RELATED APPLICATION

This application claims priority to U.S. Provisional Patent Application Ser. No. 60/567,385, filed Apr. 30, 2004, the entire content of which is incorporated herein by reference.

FIELD OF THE INVENTION

This invention relates generally to AC magnetic tracking systems and, in particular, to methods and apparatus for eddy current compensation in such systems.

BACKGROUND OF THE INVENTION

Position and orientation tracking systems ("trackers") are well known in the art. For example, U.S. Pat. Nos. 4,287,809 and 4,394,831 to Egli et al.; U.S. Pat. No. 4,737,794 to Jones; U.S. Pat. No. 4,314,251 to Raab; and U.S. Pat. No. 5,453,686 to Anderson, are directed to AC electromagnetic trackers. U.S. Pat. No. 5,645,077 to Foxlin discloses an inertial system, and combination systems, consisting or two different trackers, such as optical and magnetic, are described in U.S. Pat. No. 5,831,260 to Hansen and U.S. Pat. No. 6,288,785 B1 to Frantz et al. Other pertinent references include U.S. Pat. No. 5,752,513 to Acker et al. and U.S. Pat. No. 5,640,170 to Anderson.

AC electromagnetic trackers have definite advantages over other types of systems. For one, AC trackers provide the highest solution/update rate with the greatest accuracy, not affected by obstructed field of view, in contrast to optical solutions. AC trackers do not require reference sensor/unit and drift stable apparatus of the type required by inertial units, and they are not affected by the Earth's magnetic field and the magnetization of ferrous materials, in contrast to DC magnetic systems.

The main disadvantage of AC trackers is that they are quite susceptible to distortion due to eddy currents in conductive materials in or near the motion box where precise tracking is desired. Eddy currents are a major cause of magnetic tracker inaccuracy. Methods of dealing with the problem are various. One method is to create a map of measured transmitter-receiver coordinates versus known coordinates. This method works very well in terms of accuracy achieved, but special fixturing is required and once performed the environment cannot be altered.

A pulsed DC tracker uses a method of sequencing DC current pulses to the transmitter then waiting during each pulse for eddy current effects to decay before recording field measurements. This method offers only slow update capability and suffers from earth's magnetic field interference and noise associated with low frequency powered appliances and equipment.

Yet another tracker method uses very low AC frequencies where eddy current interference is a small part of the tracker fields, but like the pulsed DC method, suffers from slow update capability and susceptibility to low frequency noise. Still another tracker method models eddy current conductors to compensate for measured fields enabling the use of tracker frequencies well above equipment and appliance noise band. This tracker method works well in the sense that it avoids the low frequency noise band, but it does not work well in the sense that it requires two tracker modes—a normal tracker operation mode and an environment testing mode complete with additional hardware. The testing mode suspends normal tracker operation while measurements of extended conductor characteristics are made using geophysics techniques.

A widely used technique for dealing with magnetic field distortion is to map the operating area of the tracker. In this approach, the system is set up with a fixed transmitter location that produces a known area of operation for the tracker. The operating area is then broken into a three-dimensional grid, and magnetic field data are gathered for each point in the grid. The gathered data provides a direct relationship between field data and position that is then used to compensate for the distorted environment using a variety of well known computational methods. This approach works well for moderately distorted environments but requires special equipment and extensive on-site preparation to generate the map. Changes of the operating area that significantly affects accuracy may require remapping.

U.S. Pat. No. 6,172,499 is directed to an AC magnetic position measurement system that compensates for eddy current distortion by taking advantage of the fact that the quadrature term of the sensor response is determined solely by the secondary field. The system measures the in-phase (I) and quadrature (Q) components for two different frequencies and uses them to select a compensation coefficient from a look up table. The compensation coefficient is used to scale the quadrature term (Q) before it is subtracted from the in-phase (I) term. The in-phase term (I) is then used for the position calculation. This algorithm is repeated for each axis of the system, requiring six separate frequencies for the highest resolution system. A second three frequency system is also proposed which reduces the system complexity but at the cost of reduced accuracy of the compensation coefficient. This method does not address the induced magnetization of ferrous materials and requires two separate frequencies for each axis unless reduced accuracy is acceptable.

U.S. Pat. No. 6,528,989 compensates for conductive distortion by computing a correction term based on the inductive limit and phase delay of the environment. The inductive limit and phase delay are calculated using either DC pulse measurements or multiple AC frequencies. Relevant theory can be found in Grant, F. S., and West, G. F., 1965 *Interpretation Theory in Applied Geophysics* (McGraw-Hill Book Company). The use of DC pulse measurements severely limits the throughput rate of the tracker due to the extended period of time required for eddy currents to decay (~5 ms according to the author). The multiple frequency technique uses a wide range of frequencies in the magnetic field, requiring the use of a non-resonant transmitter which effectively limits the output power of the system which in turn limits useful range.

Despite these advances, the need remains for apparatus and methods of compensation for spurious, eddy-current-induced fields in AC electromagnetic tracking systems.

SUMMARY OF THE INVENTION

This invention resides in techniques for compensating for magnetic field distortion causes inaccuracy in the data in an AC magnetic tracker. Broadly, a characteristic frequency in the distortion environment is utilized to extract distortion components from the tracker receiver signals so that the corrected position and orientation can be calculated. A multiplicity of alternative techniques for determining this characteristic frequency are disclosed, several of which can be done during operation without interrupting system operation while others can be done off-line. The invention also allows the use of a tuned tracker transmitter since it does not need to operate at multiple frequencies.

While the disclosed method also incorporates eddy current models, it differs from the prior art by treating an extended conductor characteristic as just another unknown. The position and orientation algorithm solves the 6 unknown coordinates of position and orientation plus the one more unknown—the extended conductor characteristic frequency. This enables the tracker to operate full time in one mode of operation without ever suspending normal operation and without additional hardware capabilities.

While methods for solving $f_p$ using only normal tracker field data are disclosed, alternative algorithms exist not only for the approximately collocated antenna sets discussed but for other antenna configurations as well. Those skilled in the art will appreciate the application of these teachings to other antenna configurations.

DETAILED DESCRIPTION OF THE INVENTION

Magnetic trackers operate by transmitting low frequency magnetic fields with one antenna and receiving said fields on a second antenna. The position and orientation (P&O) coordinates of one antenna relative to the other are calculated from these measurements based on equations modeling the unique tracker field structure. But eddy currents in nearby extended conductors give rise to magnetic fields that distort the modeled field structure and reduce P&O accuracy.

This invention relates to the compensation of eddy current field distortion in AC magnetic trackers. By broadening the field model to incorporate the extended conductor field and increasing the number of variables in the P&O calculations, eddy current distortion compensation is realized. The new method avoids special operating modes and hardware that suspend normal tracker operation.

Figure 1:
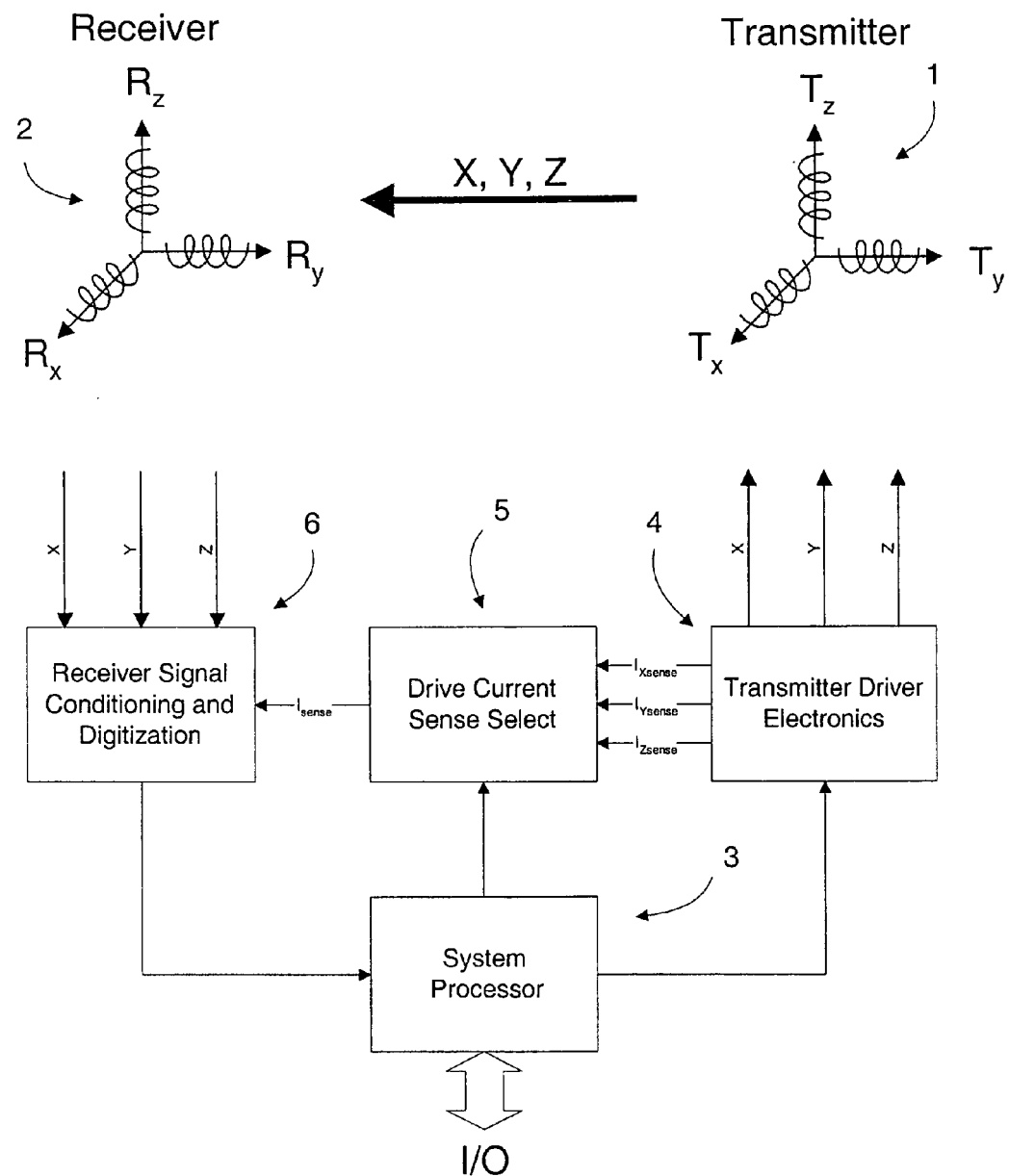
FIG. 1 is a diagram that shows an AC magnetic tracker system including at least one transmitting antenna, at least one receiving antenna, and associated electronics.

A typical tracker system (FIG. 1) includes at least one transmitting antenna (1), at least one receiving antenna (2), and associated electronics to provide transmitter current (4), receiver signal conditioning and processing (6), and digital System Processor (3). The receiver's sensed voltages are fed into the signal processor through FIG. 1 block (6). Driver currents are sensed and selected for input through Drive Current Sense Select (5) and are fed through the same signal conditioning chain as received voltages (6).

Received voltages divided by current are processed and, with a somewhat involved mathematical algorithm running in processor (3), are solved for the 6 coordinates of transmitter-receiver position and orientation. The receiver signal conditioning circuit (6) may use discrete Fourier transform or other technology known to those skilled in the art to produce in-phase and quadrature frequency components. AC tracker antennas often consist of a triad of wire coils wound about orthogonal axes and are generally collocated, or they may be separated and coplanar. Many other configurations are possible. Flux gate, Hall-effect, or magneto-resistive components to sense the fields may be used in some applications. Other means of winding coils such as printed circuit board trace may serve well in limited applications. For the present, the triad of collocated orthogonal coils will be used to describe the invention, but this should not be considered as a limitation of the invention.

Figure 2:
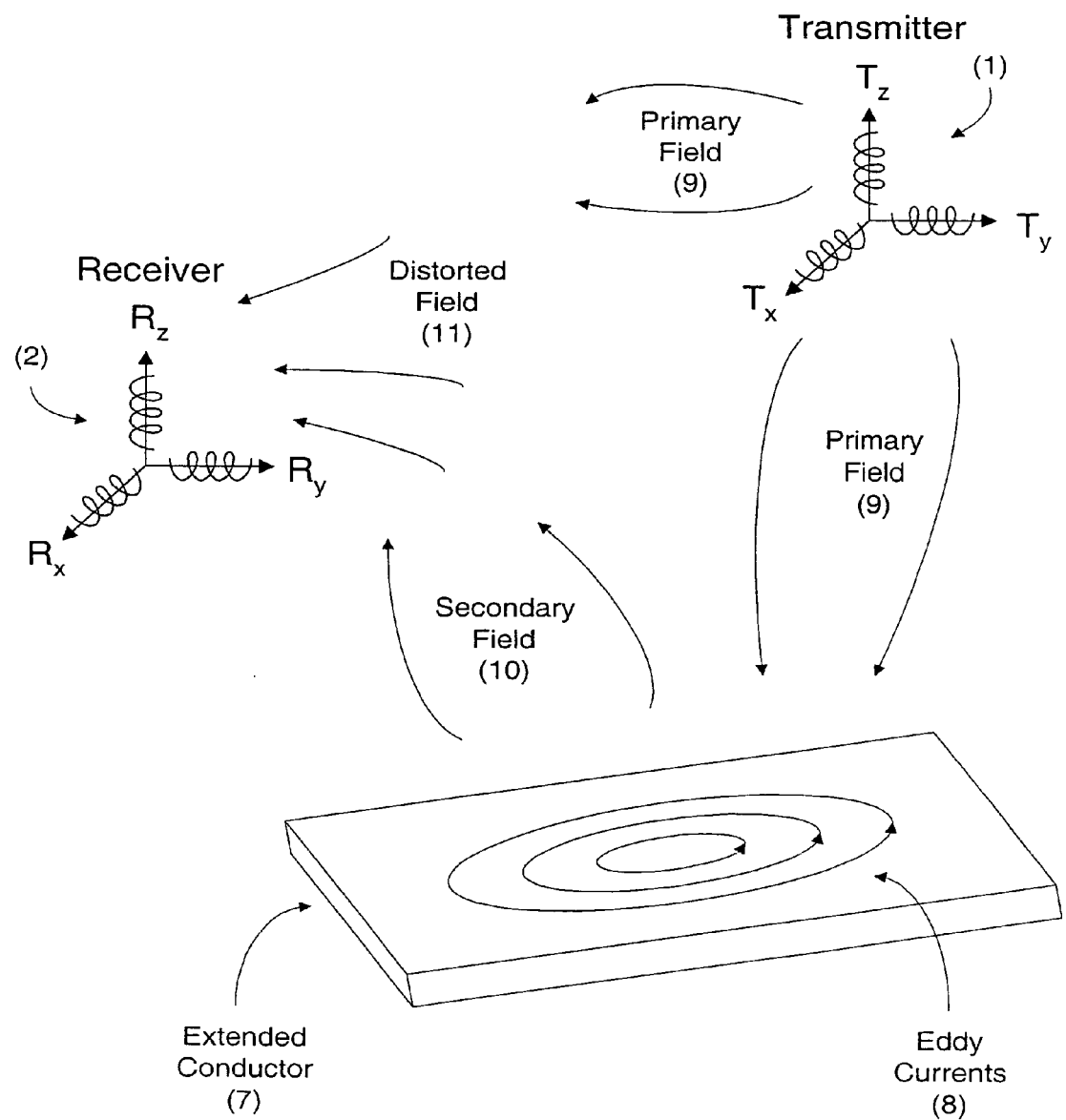
FIG. 2 illustrates how, in addition to inducing voltages in the receiver, transmitter magnetic fields also induce voltages in extended conductors.

In addition to inducing voltages in the receiver, the transmitter magnetic fields (9) (see FIG. 2) also induce voltages in extended conductors (7), such as sheets of aluminum. Induction gives rise to currents (8) of the same frequency to flow in these conductors which in turn generate secondary magnetic fields (10). When combined with the transmitter primary, distorted or anomalous fields result (11). Being of the same frequency as the intended signal, the distortion cannot simply be filtered out. To understand the coupling of the transmitter, receiver, and extended conductor the problem is analyzed as a set of inductively coupled loops, a common subject in many electromagnetic textbooks. In such analyses, an extended conductor is treated as a circuit having resistance and inductance, just as transmitter and receiver coils or loops do.

The equivalent lumped parameter circuit of the extended conductor considered here includes resistance and inductance in series. The corner or characteristic frequency, a point in the frequency domain where resistance is equal to inductive reactance, is by convenience labeled $f_p$. As we will show, $f_p$ completely characterizes the interference of diamagnetic and paramagnetic extended conductors. Generally $f_p$ is unknown, but it can be solved along with the 6 coordinates of position and orientation in a single concurrent algorithm. Once known, $f_p$ determines a compensation factor which, used in conjunction with the imaginary part of the signal, corrects for eddy current effects and improves P&O accuracy.

There are 9 coupling terms for a three-element transmitter and a three-element receiver. The coupling terms or mutual inductances are measured by dividing each of the received voltages by the time derivative of each transmitter current. Frequency-division multiplexed trackers require Fourier transform technology to separate the frequency components in the three received voltages. Algorithms for solving the P&O coordinates are taught in U.S. Pat. Nos. 4,737,794 and 5,307,072, the entire content of both being incorporated herein by reference. What follows is an analysis of extended conductor interference to one of these mutual inductances.

Let index "1" designate an arbitrary transmitter element—coil or loop. The element is driven with harmonically varying current $i_1 \, e^{j\omega t}$. Let index "2" denote an arbitrary receiver element—coil or loop. The receiver loop is modeled as an open loop since in practice receiver elements are often fed to high input impedance preamplifiers. Thus its current, $i_2$, is zero. Let index "3" designate a loop for the modeling of a non-ferrous extended conductor. $R_1$, $R_2$, and $R_3$ are the resistances of loops 1, 2, and 3, respectively, and $L_{11}$, $L_{22}$, and $L_{33}$ are their self-inductances. $L_{12}$, $L_{13}$, and $L_{23}$ are the mutual inductances that account for the magnetic coupling between loops. The object is to accurately measure $L_{12}$ the mutual inductance between transmitter loop 1 and receiver loop 2 (and ultimately the $L_{12}$'s of all nine terms); however, interference from eddy current loop 3 complicates the problem.

The following system of equations is a steady state expression for three inductively coupled loops. Loop terminal voltages are designated with v's and explicit harmonic dependency terms are omitted.

$$\begin{bmatrix} v_1 \\ v_2 \\ v_3 \end{bmatrix} = \begin{bmatrix} R_1 & 0 & 0 \\ 0 & R_2 & 0 \\ 0 & 0 & R_3 \end{bmatrix} \begin{bmatrix} i_1 \\ i_2 \\ i_3 \end{bmatrix} + j\omega \begin{bmatrix} L_{11} & L_{12} & L_{13} \\ L_{12} & L_{22} & L_{23} \\ L_{13} & L_{23} & L_{33} \end{bmatrix} \begin{bmatrix} i_1 \\ i_2 \\ i_3 \end{bmatrix}$$

By design or measurement $i_1$ (transmitter current) is known, $v_2$ (receiver voltage) is measured, $\omega=2\pi f$ is known, $i_2$ (receiver current) is zero (open loop), and $V_3$ is zero (closed loop, Kirchhoff's voltage equation). Solving for $v_2$ divided by $j\omega i_1$ (the time derivative of driver current), yields $$\frac{v_2}{j\omega i_1} = L_{12} - \frac{j\omega L_{13} L_{23}}{R_3 + j\omega L_{33}}$$

In the absence of an extended conductor $L_{13}$ and $L_{23}$ are zero, and $L_{12}$ is accurately revealed; but, in its presence $L_{13}$ and $L_{33}$ may not be zero, and $L_{12}$ is not isolated. Substituting $s_{12}=v_2/j\omega i_1$ then separating the above into its real and imaginary parts yields, $$\text{Re}(s_{12}) = L_{12} - \frac{\omega^2 L_{13} L_{23} L_{33}}{R_3^2 + \omega^2 L_{33}^2}$$

$$\text{Im}(s_{12}) = -\frac{\omega L_{13} L_{23} R_3}{R_3^2 + \omega^2 L_{33}^2}$$

Substituting $f_p = R_3/2\pi L_{33}$, we note that the second term of the real part can be expressed as a simple factor times the imaginary part. Rearranging yields $$L_{12} = \text{Re}(s_{12}) - \frac{f}{f_p}\text{Im}(s_{12})$$

This equation states that $L_{12}$ can be recovered in the presence of a non-ferrous extended conductor by simply subtracting from the real part $f/f_p$ times the imaginary part.

The eddy current interference real and imaginary parts are rearranged, normalized, and plotted here.

$$\text{Re(Eddy)} = \frac{L_{13} L_{23}}{L_{33}} \frac{(f/f_p)^2}{1+(f/f_p)^2}$$

$$\text{Im(Eddy)} = \frac{L_{13} L_{23}}{L_{33}} \frac{(f/f_p)}{1+(f/f_p)^2}$$

Figure 4:
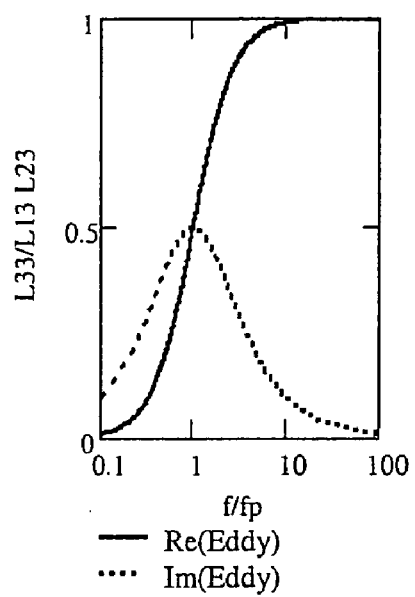
FIG. 4 shows that the real part of eddy current interference.

The plot in FIG. 4 shows that the real part of eddy current interference (solid line) begins at zero, grows with frequency, and tends toward unity while the imaginary term (dotted line) also starts at zero, but peaks at $f/f_p=1$ then heads back towards zero. This demonstrates that a good conductor (low $f_p$) presents a greater eddy current challenge at high tracker frequencies since there is little imaginary part to work with and the required correction factor becomes large. It also shows that at very high tracker frequencies there is virtually no imaginary part.

We note that processed noise of the compensation term increases by the factor $f/f_p$, and that quality eddy current detection (indicated by the imaginary part) depends on the ability of tracker electronics to accurately discern in-phase and quadrature signals. Phase shift in current generation and signal reception electronics could be misinterpreted as eddy current distortion.

The above analysis applies to each of the 9 $L_{12}$ terms of a tracker $\tilde{S}$ matrix (we use a tilde to denote 3×3 matrices). Since all 9 terms are affected by the same extended conductor, the entire matrix is compensated in an identical manner.

$$\tilde{S}_{cmp} = \text{Re}(\tilde{S}_{msd}) - f/f_p \text{Im}(\tilde{S}_{msd})$$

The msd subscript indicates a tracker measured signal matrix, while cmp represents a compensated signal matrix. The above equation applies to time-division multiplexed trackers. For frequency-division multiplexed trackers, where columns of $\tilde{S}_{msd}$ are collected at different frequencies, e.g. $f_x$, $f_y$, and $f_z$, compensation takes on the form $$\tilde{S}_{cmp} = \text{Re}(\tilde{S}_{msd}) - \text{Im}(\tilde{S}_{msd}) \begin{bmatrix} f_x/f_p & 0 & 0 \\ 0 & f_y/f_p & 0 \\ 0 & 0 & f_z/f_p \end{bmatrix}$$

Except for the very high frequencies mentioned above, it matters not where we choose to operate on the frequency curve. The three frequencies $f_x$, $f_y$, and $f_z$ may all be to the left of the peak ($f/f_p=1$), all to the right, or grouped about the peak in any manner.

To understand how $f_p$ can be discovered using only tracker field structures, we briefly review the mutual inductance model of three element transmitters and receivers. Unit loop areas are assumed for both antennas for the sake of brevity. The model is $$\tilde{S}_{mod} = \frac{\mu_0}{4\pi r^3} \tilde{A}^T \tilde{P} \tilde{H} \tilde{P}^T$$

All matrices and scalar terms in this expression are real (no "j" terms). "$\tilde{A}$" is receiver attitude, "$\tilde{P}$" is the position matrix, "r" is the distance between transmitter and receiver, $\mu_0$ is the permeability of free space, and "T" designates matrix transpose (see Jones '794 C4 L42–L59). Terms arising from loop aperture and non-concentricity are not shown. The details of how they are extracted from the measured signal matrix are explained in '794 and '072. Matrix "$\tilde{H}$" (see '794 C8 L5) has the form $$\tilde{H} = \begin{bmatrix} 2 & 0 & 0 \\ 0 & -1 & 0 \\ 0 & 0 & -1 \end{bmatrix}$$

The model is expanded to include eddy current distortion $$\tilde{S}_{mod} = \frac{\mu_0}{4\pi r^3} \tilde{A}^T \tilde{P} \tilde{H} \tilde{P}^T + f/f_p \text{Im}(\tilde{S}_{msd})$$

$F_p$ can be solved in a number of ways; we show 8 methods in the following paragraphs.

Method 1

The equation immediately above has seven variables (unknowns)—"Ã", attitude, represents three; "r", range, represents one, "P̃", position matrix, two; and $f_p$, eddy current characteristic frequency, one more. Let matrix D̃ represent the difference between measured and modeled.

$$\tilde{D} = Re(\tilde{S}_{msd}) - \tilde{S}_{mod}$$

The problem statement is, given the 9 constraints $Re(\tilde{S}_{msd})$, solve the model's 7 unknowns that minimize the "$l_2$-norm" of the difference between constraint and model, δ, in a least squares sense.

$$\delta = \sum_{i,j=1}^{3} D(f_k)_{ij}^2$$

The non-linear problem can be solved by a great many minimization methods, one being the Levenberg-Marquardt method or LMM. For reference on its theory and application see Press et al. 1992, *Numerical Recipes in C* (Cambridge University Press) Chapter 15, or Moré et al. 1980, *User Guide for MINPACK-1*, Argonne National Laboratory Report ANL-80-74.

Method 2

A reduction in complexity is possible by constructing $\tilde{S}_{cmp}{}^T\tilde{S}_{cmp}$. This matrix product, a function of $f_p$, is independent of attitude Ã.

$$\tilde{S}_{cmp}{}^T\tilde{S}_{cmp} = [Re(\tilde{S}_{msd}) - f/f_p Im(\tilde{S}_{msd})]^T [Re(\tilde{S}_{msd}) - f/f_p Im(\tilde{S}_{msd})]$$

The matrix product is solved for position (P̃ and r) as taught in '794 and '072.

$$\tilde{S}_{cmp}^T \tilde{S}_{cmp} \Rightarrow \left(\frac{\mu_0}{4\pi r^3}\right)^2 \tilde{P}\tilde{H}^2\tilde{P}^T \Rightarrow \tilde{P}, r$$

Rearranging and accounting with D̃ for the mismatch of the model due to an inexact $f_p$ yields $$\tilde{D}(f_p) = \left(\frac{4\pi r^3}{\mu_0}\right)^2 \tilde{P}^T \tilde{S}_{cmp}^T \tilde{S}_{cmp} \tilde{P} - \tilde{H}^2$$

This effectively reduces the minimization algorithm to one dimension (one unknown) which can be solved by LMM or any number of simpler algorithms such as quadratic search. To start a quadratic search, guess three $f_p$ values, $f_0-\Delta f$, $f_0$, $f_0+\Delta f$, for example 1500, 2000, 2500 Hz. Perform three trial compensations of the $\tilde{S}_{msd}$ matrix. Solve each for position according to the algorithms taught in Jones '072 and '794, reconstruct the P̃ matrix, compute the expression immediately above subtracting $\tilde{H}^2$, and solve for the three residual D̃ matrices. Finally, find the "$l_2$-norm" squared for each of the guessed $f_p$'s.

$$\delta_k = \sum_{i,j=1}^{3} D(f_k)_{ij}^2$$

The object is to find the $f_p$ that minimizes δ. A reasonable approach is to use a Quadratic-Convergent Search without Derivatives [see Pierre, D. A., 1986 *Optimization Theory with Applications* (Dover Publications, Inc., New York), section 6–3]. Given $\delta_1$, $\delta_2$, $\delta_3$ corresponding to the three trial frequencies, respectively, an estimate of $f_p$ that minimizes δ is given by, $$f_p = f_0 + \frac{1}{2}\frac{(\delta_1 - \delta_3)\Delta f}{(\delta_1 - 2\delta_2 + \delta_3)}$$

Care must be taken that the denominator is not zero or even small since the compensation factor may become too large. Care must also be taken to check that the denominator is positive else $f_p$ would evaluate a maximum δ and not a minimum. Much of this is avoided by bracketing $f_p$—a low value of 200 Hz and a high value of 50,000 Hz is suggested.

All the above can be accomplished in the 1$^{st}$ tracker system update frame. On the 2$^{nd}$ tracker frame, choose three new trial frequencies based on the $f_p$ just calculated—$f_p-\Delta f$, $f_p$, $f_p+\Delta f$. The process continues ad infinitum. By the 2$^{nd}$ or 3$^{rd}$ tracker frame (about 25 milliseconds for 120 Hz frame or update rates) $f_p$ should be exact. Since $f_p$ is not expected to change by more than 1 to 2 Hz from frame to frame even with fast transmitter-receiver motion, tracker solutions for the center frequency $f_p$ are always accurate and tracker operation is unaffected by a changing environment.

Method 3

In the event tracker throughput is insufficient to solve three positions in a single frame the workload per frame can be reduced to two solutions per frame. On even frame numbers solve only $\delta_1$ and $\delta_2$; on odd frames solve $\delta_2$ and $\delta_3$. Re-compute $f_p$ every other frame.

Method 4

In the event tracker throughput is insufficient to solve $f_p$ at all without degrading frame update rates, the following solution may be applied. In a special mapping mode the tracker update rate is reduced to permit sufficient time for fp and P&O solutions. The operation is as follows:

1) With the receiver (or transmitter) in hand or on the end of a small wand, the device is translated throughout the tracker region of interest. There is no special fixturing or special device coordinates to be observed. The wand can be waved about randomly.
2) $F_p$ and P&O are collected continuously and either a table or polynomial function of $f_p$ versus position is constructed in an offline computer program. The data are decimated to throw out redundant points to reduce the volume of data presented to the regression process. The table or polynomial coefficients are downloaded to the tracker.
3) In real time and at full update rate, the tracker looks in the table or evaluates the polynomial to find the $f_p$ corresponding to tracker position and applies the compensation factor of $f/f_p$ as detailed above. To initialize the process, an average $f_p$ may be used.

Method 5

This method is identical to Method 4 except that no table or polynomial is downloaded. Instead just an averaged $f_p$ is determined and downloaded. The tracker uses the average regardless of what the actual $f_p$ may be. This is useful for limited tracker throughput in environments where $f_p$ changes but very little. Residual tracker errors could be mapped by traditional means with special fixtures. The benefit is high update rates with improved accuracy.

Method 6

Still another method uses two or more receivers. This method requires a special wand, paddle, or small fixture that has two or more receivers (transmitters) mounted such that their locations and/or orientations relative to one another are precisely known. Their coordinates relative to the transmitter (receiver) or anything else need not be known.

For example, suppose two receivers are mounted on the ends of a 6 inch wand. Let $\tilde{A}_1$ and $\tilde{A}_2$ be their orientation (attitude) matrices, and $\tilde{A}_K = \tilde{A}_2^T \tilde{A}_1$ be their known relative orientation. The wand is waved about as in Method 5. The absolute orientations are unknown at first because $f_p$ is unknown, but their relative orientations are known by construction. In a region of no distortion, the product $\tilde{A}_2^T \tilde{A}_1 \tilde{A}_K^T$ would evaluate to the identity matrix regardless of how the wand is positioned or oriented; but, in a region of eddy current distortion, the product will be something other than the identity. Let the matrix $\tilde{\alpha}$ represent this error $$\tilde{\alpha} = \tilde{A}_2^T \tilde{A}_1 \tilde{A}_K^T - \tilde{I}$$

$F_p$ can be discovered by a method similar to Method 2. First compute the orientations of the two receivers with three trial $f_p$, then find the $f_p$ that minimizes the norm of $\tilde{\alpha}$. Quaternions may be used to represent attitude. The use of Euler angles is not recommended.

Method 7

A variation on Method 6 is to develop an error term of position or as a combination of position and orientation. The latter is discussed here. A rigid fixture is required with two or more receivers (transmitters) mounted at known positions and orientations relative to the fixture's reference frame. Find the point $p_0$ that is the approximate center of "gravity" of the N receivers. This will ensure equal weighting of receiver P&O data. The position of the COG relative to the $i^{th}$ receiver (transmitter) is designated by vector $\vec{d}_i$. In the transmitter's (receiver's) frame of reference the fixture's COG requires the additional information of $i^{th}$ receiver position and orientation. The relation $\vec{r}_{0i} = \vec{r}_i + \tilde{A}_i \vec{d}_i$ expresses this. In a perfect environment the $\vec{r}_{0i}$ for all N receivers (transmitters) will be equal. In a distorted magnetic field environment, they will differ. One possibility of forming an error term is to calculate a mean COG position vector.

$$\vec{r}_{mean} = \frac{1}{N} \sum_{i=1}^{N} \vec{r}_{0i}$$

Then form N difference vectors $\Delta \vec{r}_i = \vec{r}_{0i} - \vec{r}_{mean}$, and sum their norms.

$$\Delta r^2 = \sum_{i=1}^{N} |\Delta r_i|^2$$

By a process like that of Method 2, minimize $\Delta r$ in a least RMS sense.

Figure 3:
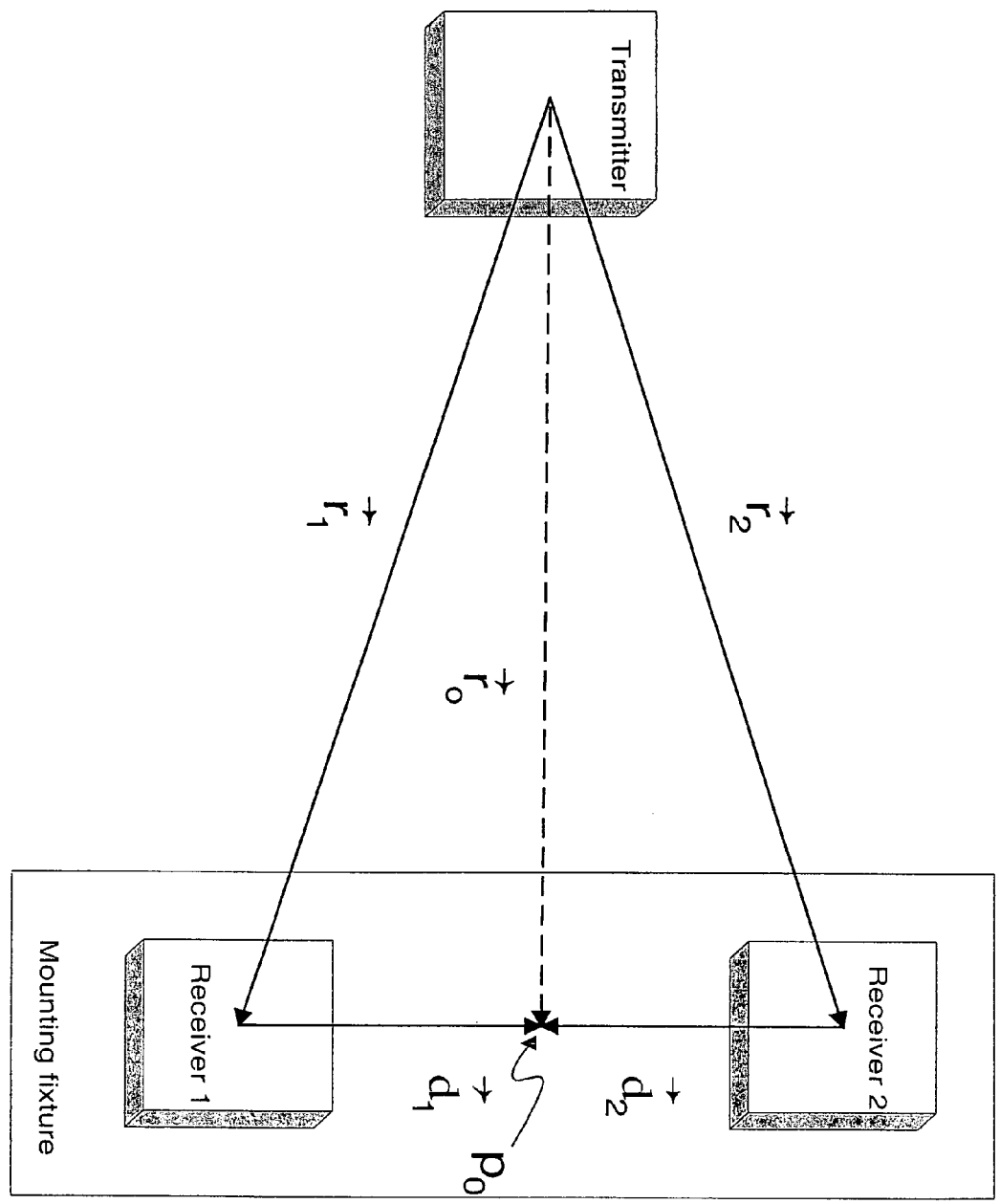
FIG. 3 depicts a two sensor approach associated with a method of identifying a characteristic frequency in the distortion environment.

FIG. 3 depicts a two sensor approach of this method

Method 8

A final method is discussed. A single receiver (transmitter) is used in this method. Its orientation relative to the transmitter (receiver) must be known. Let $\tilde{A}_K$ be the known orientation. Distortion will make the measured orientation inaccurate. Its change can be quantified by the expression $\tilde{\alpha} = \tilde{A}_K^T \tilde{A} - \tilde{I}$. Again, by a method such as described in Method 2, minimize$|\tilde{\alpha}|$, the norm of the difference between attitude error and the identity matrix.

What is claimed is:

1. A method of compensating for eddy current distortion in an AC magnetic tracking system bused on a measured signal matrix with real and imaginary parts and a tracker frequency, f, the method comprising the steps of:
   determining the characteristic frequency of an extended conductor, $f_p$, defined as a point in the frequency domain where resistance is equal to inductive reactance;
   computing a compensated signal matrix using $f_p$; and
   using the compensated signal to determine the position and orientation of an object or body.

2. The method of claim 1, wherein the compensated signal matrix is computed using $f/f_p$.

3. The method of claim 1, including the steps of:
   computing the compensated signal matrix by multiplying the imaginary part of the measured signal matrix by $f/f_p$; and
   subtracting the result from the real part of the measured signal matrix.

4. The method of claim 1, including the steps of:
   collecting the measured signal matrix at different frequencies $f_x$, $f_y$, and $f_z$;
   computing the compensated signal matrix by multiplying the imaginary part of the measured signal matrix by $$\begin{bmatrix} f_x/f_p & 0 & 0 \\ 0 & f_y/f_p & 0 \\ 0 & 0 & f_z/f_p \end{bmatrix};$$

and
   subtracting the result from the real part of the measured signal matrix.

5. The method of claim 1, wherein $f_p$ is determined by:
   modeling the signal matrix including eddy current distortion;
   finding the difference between the measured signal matrix and the modeled signal matrix; and
   minimizing the $l_2$-norm of the difference in a least-squares sense.

6. The method of claim 1, wherein $f_p$ is determined by:
   multiplying the measured signal matrix and its transpose; and
   using the result as part of a quadratic search to solve for $f_p$.

7. The method of claim 1, wherein $f_p$ is determined by:
multiplying the measured signal matrix with its transpose; and
using the result and a plurality of trial frequencies in conjunction with a quadratic-convergent search without derivatives to solve for $f_p$.

8. The method of claim 1, wherein $f_p$ is determined by:
translating a receiver or transmitter throughout a region of interest;
collecting position and orientation coordinates and $f_p$ during the translation;
compiling data regarding $f_p$ versus position;
using the data during actual tracking to find the $f_p$ relating to current tracker position; and
computing a compensated signal matrix using $f/f_p$.

9. The method of claim 8, including the step of decimating to remove redundant data.

10. The method of claim 8, including the step of using an average $f_p$ to initialize the process.

11. The method of claim 1, wherein $f_p$ is determined by:
determining an average $f_p$; and
computing a compensated signal matrix using $f$/average $f_p$.

12. The method of claim 1, wherein $f_p$ is determined by:
mounting two or more receivers or transmitters having known relative locations and/or orientations;
translating the receivers or transmitters throughout a region of interest, such that in a region of eddy current distortion error is represented by a matrix $\bar{\alpha}$ derived from the product of orientation (attitude) matrices;
computing the orientations of the receivers or transmitters using a plurality of trial $f_p$ values; and
finding the $f_p$ that minimizes the norm of $\bar{\alpha}$.

13. The method of claim 12, wherein quaternions are used to represent attitude.

14. The method of claim 1, wherein $f_p$ is determined by:
mounting two or more receivers or transmitters having known relative locations and orientations;
finding a point $p_0$ which approximates the center of gravity (COG) of the receivers or transmitters;
designating the position of the COG relative to the $i^{th}$ receiver or transmitter by a vector $\vec{d}_i$;
using the relation $\vec{r}_{0i} = \vec{r}_i + \tilde{A}_i \vec{d}_i$ in the frame of reference of the receivers or transmitters to provide additional information regarding the position and orientation of the $i^{th}$ receiver;
forming an error term by calculating a mean COG position vector using:

$$\vec{r}_{mean} = \frac{1}{N} \sum_{i=1}^{N} \vec{r}_{0i}$$

forming N difference vectors $\Delta \vec{r}_i = \vec{r}_{0i} - \vec{r}_{mean}$, and summing their norms; and $$\Delta r^2 = \sum_{i=1}^{N} |\Delta r_i|^2$$

minimizing $\Delta r$ to derive $f_p$.

15. The method of claim 1, wherein $f_p$ is determined by:
providing a single receiver (transmitter) having a known orientation $\tilde{A}_K$ relative to a transmitter (receiver) forming part of the tracking system;
quantifying measured orientation using the expression $\tilde{\alpha} = \bar{A}_K^T \bar{A} - \bar{I}$; and
minimize $|\tilde{\alpha}|$, the norm of the difference between attitude error and the identity matrix, to derive $f_p$.

16. A magnetic position and orientation measurement system for operation in the presence of conductive metallic objects, the system comprising:
at least one transmitter with at least one coil operative to create an AC magnetic field in a space;
at least one receiver with at least one coil in the space for detecting the AC magnetic field;
one or more processors operative to perform the following functions:
a) determine the characteristic frequency of an extended conductor, $f_p$, defined as a point in the frequency domain where resistance is equal to inductive reactance,
b) compute a compensated signal matrix using $f_p$, and
c) use the compensated signal to determine the position and orientation of the receiver.

17. The system of claim 16, wherein:
distortion is based on a measured signal matrix with real and imaginary parts and a measurement frequency, $f$, and wherein the processor(s) are operative to:
determine the characteristic frequency, $f_p$, where real and imaginary components are equal in amplitude;
compute a compensated signal matrix using $f_p$; and
compute the position and orientation using the compensation signal matrix.

18. The system of claim 17, wherein the compensated signal matrix is computed using $f/f_p$.

* * * * *